United States Patent [19]

Adur et al.

[11] Patent Number: 4,833,195

[45] Date of Patent: May 23, 1989

[54] HIGH FLOW DRAPABLE POLYMER COMPOSITIONS

[75] Inventors: Ashok M. Adur, Hackettstown; Joseph M. Hogue, Jr., Irvington, both of N.J.

[73] Assignee: BP Performance Polymers, Inc., New York, N.Y.

[21] Appl. No.: 75,400

[22] Filed: Jul. 20, 1987

[51] Int. Cl.[4] ...................... C08L 23/16; C08L 23/26; C08L 23/04; C08L 23/10
[52] U.S. Cl. ...................................... 524/528; 525/74; 525/75; 525/76; 525/77; 525/78; 525/80; 525/232; 525/240; 525/194; 525/211; 525/227; 525/221; 525/387; 525/938; 524/487; 524/490; 524/491; 524/504; 524/525
[58] Field of Search ............... 525/194, 240, 73, 74, 525/387, 938, 76, 77, 78, 80, 211; 524/490, 491, 487, 504, 528; 528/503

[56] References Cited

U.S. PATENT DOCUMENTS

| | | | |
|---|---|---|---|
| 3,220,966 | 11/1965 | Flanagan | 525/240 |
| 3,271,340 | 9/1966 | Shearer et al. | 525/240 |
| 3,402,140 | 9/1968 | Bickel et al. | 524/490 |
| 3,506,740 | 4/1970 | Dempsey et al. | 525/193 |
| 3,838,080 | 9/1974 | Shinomura et al. | 524/490 |
| 3,862,106 | 1/1975 | Fischer | 525/331.7 |
| 3,862,265 | 1/1975 | Steinkamp et al. | 525/74 |
| 3,987,122 | 10/1976 | Bartz | 525/74 |
| 4,087,486 | 5/1978 | Fielding et al. | 525/194 |
| 4,208,310 | 6/1980 | Lundberg et al. | 524/490 |
| 4,282,076 | 8/1981 | Boynton | 525/240 |

*Primary Examiner*—Carman J. Seccuro
*Attorney, Agent, or Firm*—Rodman & Rodman

[57] ABSTRACT

A thermoplastic pelletizable polymer composition comprising an oligomer or degraded polyolefin and an olefinic elastomer. Optionally, the composition can also include a polyolefin thermoplastic polymer. The composition, when converted to a film or fabric meets the criteria or drapability, low hardness on the Shore A scale, high melt flow and reprocessability.

20 Claims, No Drawings

HIGH FLOW DRAPABLE POLYMER COMPOSITIONS

BACKGROUND OF THE INVENTION

1. FIELD OF THE INVENTION

This invention relates to thermoplastic polymer compositions characterized by high melt flow, which are pelletizable and can be conveniently converted into fabric and film that is drapable.

2. DESCRIPTION OF THE PRIOR ART

Several methods have been used to produce fabric or film materials. For example, fabric can be produced by knitting, tufting, wool felting, weaving, or by non-woven means. A non-woven fabric can be produced by bonding and/or interlocking fabric materials by mechanical, chemical, thermal or solvent means, or through a combination of these means in accordance with ASTM D-1117-63, Part 24, Page 315 (1965). In a narrower sense, the term "non-woven" denotes a web or mat of fibers held together with bonding materials. Non-woven fabrics were originally developed as inexpensive substitutes for woven fabrics, and have gradually entered markets for which they are uniquely suitable, such as facings or top sheets in diapers, incontinent pads, bed pads, sanitary napkins, hospital gowns, and the like.

Sources of useable fibers include cellulosics, nylon, polyesters, polyolefins, fluorocarbons, and inorganic fibers. Other polymers include polyvinyl alcohol, polyvinyl acetate, vinyl chloride polymers, styrenebutadiene copolymers, acrylic resins, polyurethanes and the like.

Film materials can be prepared by cast or blown extrusion, compression molding, or other methods known to those skilled in the art.

U.S. Pat. No. 4,368,233 to Barkis et al discloses extrusion coating compositions for woven and non-woven polyolefin substrates which employ mixtures of high density polyethylene with other polyolefins.

U.S. Patent No. 4,426,417 to Meitner et al discloses a wiper comprised of a matrix of non-woven fibers incorporating a staple fiber mixture containing synthetic and cotton fibers.

U.S. Pat. No. 4,380,570 to Schwarz discloses an apparatus and process for forming fine fibers from molten thermoplastic polymers by extruding the molten polymer through orifices in nozzles at low melt viscosity and high temperatures. The molten fibers are accelerated to near sonic velocity by gas blown in parallel flow through small orifices surrounding each nozzle.

U.S. Pat. No. 4,568,596 to Johnson discloses a non-woven, texturized fabric produced by embossing a molten film of a polymer blend of high density polyethylene and polystyrene.

U.S. Pat. Nos. 4,211,692 and 4,255,323, both to Barkis et al, disclose extrusion coating compositions for woven and non-woven polyolefin substrates which employ an ethylene-propylene-diene terpolymer rubber, a high density polyethylene, an ethylene-propylene block copolymer and an ethylene-isobutylacrylate copolymer.

U.S. Pat. No. 4,383,925 to Hilsher et al discloses non-woven fabrics of polyolefin filament used for making filters.

U.S. Pat. No. 4,291,082 discloses breathable fabrics.

U.S. Reissue Pat. Nos. 32,028 and 30,405, both to Fischer, disclose a thermoplastic blend of partially cured mono-olefin copolymer rubber and polyolefin plastic.

U.S. Pat. No. 2,631,954 to Bright discloses a film composition formed from ethenoid polymers with an average molecular weight greater than 2500, obtained by heating ethylene in the presence of one or more organic compounds containing one or more double bonds and capable of forming dimers or high polymers.

U.S. Pat. No. 2,726,230 to Carlson discloses plastic acrylic interpolymers formed by polymerizing a monomeric mixture containing an acrylic ester and an olefinically unsaturated carboxylic acid.

U.S. Pat. No. 3,192,288 to Sayko et al discloses blends of low pressure isotactic polypropylene, polyisobutylene, and small amounts of high pressure polyethylene.

U.S. Pat. No. 4,500,681 to Shulman relates to a thermoplastic elastomeric blend of a polyolefin, an isobutylene-backbone elsstomer, and a copolymer of ethylene with an unsaturated ester of a lower carboxylic acid.

U.S. Pat. No. 4,100,240 to Bassani discloses a process for extruding a low viscosity fiber containing a polysiloxane liquid polymer precursor which reacts when heated to form a cross-linked fiber reinforced polysiloxane elastomer.

U.S. Pat. No. 4,336,212 to Yoshimura discloses a composition comprising:

(a) at least one of low density polyethylene and copolymers of ethylene with vinyl ester monomers, unsaturated aliphatic monocarboxylic acids and alkyl ester derivatives, (b) an ethylene alpha-olefin copolymer elastomer, and (c) at least one of crystalline polypropylene, high density polyethylene, and crystalline polybutene-1.

U.S. Pat. No. 4,341,667 to Lal et al discloses blends of reclaimed rubber devulcanized by microwave energy, with crystalline or semi-crystalline polyolefins, such as polyethylene or polypropylene.

U.S. Pat. No. 4,399,249 to Bildusas discloses a block copolymer blend containing at least two end thermoplastic polymer blocks and one mid-polymer block, wherein the end block is a non-elastomeric polymer block, and the mid-block is an elastomeric polymer block.

Despite the wealth of fabric technology, there is no known synthetic fabric which is drapable and which has a high melt flow suitable for extrusion coating or spin bonding, and which is also pelletizable.

Drapability is especially important as a comfort property in situations where the film or fabric comes into contact with human skin for extended periods of time, on the order of several hours.

Pelletizability is an important characteristic because pellets can be extruded like a thermoplastic and converted to film or fabric at high production rates in an extruder adapted with the necessary equipment for final conversion to the desired shape and form.

SUMMARY OF THE INVENTION

The present invention relates to a thermoplastic pelletizable polymer composition comprising an oligomer or degraded polyolefin and an olefinic elastomer. Optionally, the composition can also include a polyolefin thermoplastic polymer with or without a functional group. The composition, when converted to a film or fabric meets the criteria of drapability, low hardness on the Shore A scale, high melt flow and reprocessability.

DESCRIPTION OF THE PREFERRED EMBODIMENTS

In accordance with the present invention, it has been found that a thermoplastic polymer composition comprising:

(a) an oligomer or degraded polyolefin having a molecular weight less than about 15,000 and a melt flow rate greater than about 300 grams/10 minutes at 230° C. and 2.16 kilograms; and (b) an olefinic elastomer, having an elastic modulus of less than about 6000 psi at room temperature when measured in the uncrosslinked state, wherein the combination of components (a) and (b) produces a pelletizable composition with a high melt flow, which, when converted to a film or fabric, is reprocessable, drapable, and has a low hardness on the Shore A scale, when the ratio of (a):(b) varies from about 90:10 to 20:80, respectively.

The polyolefin oligomer suitable for use in the present invention can be made from one or more suitable alpha-olefin monomers such as hexene-1, pentene-1, isopentene, ethylene, propylene, butene-1, isobutene, 4-methylpentene-l, butadiene, and mixtures thereof. For purposes of this invention, an "oligomer" is defined as a macromolecular substance that has a number average molecular weight less than about 15,000 or a melt flow rate greater than about 300 grams/10 minutes at 230° C. and 2.16 kilograms, preferably over 1000 grams/10 minutes. The melt flow rate is measured in accordance with ASTM D-1238-86.

Alternatively, or in addition, the oligomer can be prepared by degrading a polyolefin. A specific example is the degrading of polypropylene in a melt blending reactor or extrusion with a free radical initiator. Thus, a suitable free radical degraded polyolefin can be a blend of 5% dicumyl peroxide and polypropylene prepared in accordance with the procedure disclosed in U.S. Pat. No. 4,451,589 to Moorman et al, which, when reacted in a melt blending or extruding operation, produces a polypropylene with a melt flow rate greater than 600 grams/10 minutes at 230° C. and 2160 grams. This blend could be used as a masterbatch in the present invention. A masterbatch is a concentrate which is subsequently used as one of the components in a formulation. The degraded polyolefin can also be prepared in situ by using a blend of polyolefin with a suitable degradant.

Extruder modified polypropylene is also available in commercial grades from Exxon Chemical Company and Himont Chemical Company with melt flow rates varying from about 325 to greater than 2000. U.S. Pat. No. 4,282,076 to Boynton discloses this technology in the context of a process utilizing ionized radiation or oxidation.

The polyolefin oligomer can also be a polyethylene or polypropylene wax, or preferably, amorphous or atactic polypropylene synthesized or produced as a byproduct in the manufacture of crystalline polypropylene.

Also suitable are polyolefin co-oligomers produced by co-oligomerizing two or more monomers, such as propylene, isobutylene, butene-1, pentene-1. A suitable commercial formulation is sold by El Paso Products Company under the trademark Amorphous Polyalphaolefin (APAO), with grade variations identified as X-100, B3A15, X-400, 311A, etc. All of the above mentioned materials can be used as the polyolefin oligomer, alone or in combination.

It is to be noted that the use of a conventional polyolefin, such as low density polyethylene, in place of the polyolefin oligomer component of the inventive composition, would result in a composition which would not fulfill the high melt flow criterion which is an essential requirement of the present invention. Thus, in U.S. Pat. No. 4,078,020 to Rose et al and U.S. Pat. No. 4,108,947 to Kimura et al, each discloses a polymer of an alpha olefin in combination with an olefinic elastomer. These compositions do not have a sufficiently high melt flow rate and are incapable of conversion into a fabric or film having the drapability characteristics of the present invention.

The olefinic or polyolefin elastomers suitable for use in the present invention have an elastic modulus of about 6000 psi or less at room temperature when measured in the uncrosslinked state in accordance with ASTM D638-72. The specific olefinic elastomers include ethylene-propylene copolymers, ethylene-propylene-diene terpolymers, ethylene-acrylic ester copolymers, polybutadiene, polyisoprene, natural rubber, isobutylene, and mixtures thereof. It is also contemplated that other equivalent elastomers which satisfy the elastic modulus requirement can also be used. The polyolefin elastomer can also include an oil extender, such as a naphthenic or paraffinic oil.

An optional polyolefin thermoplastic polymer can also be included in the composition. The polyolefin thermoplastic polymer is a linear or branched polymer which can be repeatedly softened and made flowable when heated and returned to a hard state when cooled to room temperature. It generally has an elastic modulus greater than 6,000 psi using the method of ASTM D638-72. Thermoplastics can also be molded or extruded into articles of any predetermined shape when heated to the softened state. Suitable polyolefin thermoplastic polymers include an ethylene polymer, such as high density polyethylene (HDPE), low density polyethylene (LDPE), linear low density polyethylene (LLDPE), ethylene vinyl acetate (EVA), ethylene methyl acrylate (EMA), and ethylene ethyl acrylate (EEA). Other suitable polyolefin thermoplastic polymers include polypropylene homopolymers and copolymers, poly(butene-1), poly(4-methylpentene-l), and other equivalent polyolefins.

In instances where dyeability is necessary or desirable, the polyolefin thermoplastic polymer component can be grafted or suitably modified with a monomer containing a dyeable functional group such as carboxylic acid and its derivatives, including anhydrides, acid chlorides, amides, imides and the like. Other functional groups include amines, isocyanates and other reactive groups. A specific example of a dyeable component would be polypropylene grafted with acrylic acid or maleic anhydride or a copolymer of ethylene with methacrylic acid or acrylic acid.

The relative proportion of the oligomer or degraded polyolefin to the olefinic elastomer cnn vary from about 90:10 to 20:80, preferably about 30:70 to 70:30, respectively. The proportion of the polyolefin thermoplastic polymer to the combined amount of the oligomer and olefinic elastomer can vary from about 0 to 30%, preferably 0.2 to 15%. As already noted, part or all of the polyolefin thermoplastic polymer can be modified to provide dyeability to the composition.

A suitable means for accomplishing the blending of the components of the inventive composition is to premix them and then extrude the blend composition through a heated extruder. Other mixing means such as a Brabender mixer, Banbury mixer, roll mills, single screw or multiple screw extruders, cokneaders, kneader-extruders, FCM mixers, gelmat mixers, and continuous and batch mixers can also be used.

Processability is the ability to produce the blend in a process such as extrusion and to convert it into a film or fibers which can subsequently or simultaneously be converted to a woven or non-woven fabric for specific applications such as wipes or other suitable articles of clothing or articles of manufacture such as diapers, sanitary napkins, incontinent pads, bed pads, hospital gowns, and the like by conventional processes known to those skilled in the art.

The processability of the blend composition can be evaluated for different applications by examining test specimens for surface finish smoothness and absence of imperfections. Although the criteria for processability as well as for pelletizability and drapability are qualitative, those skilled in the art are readily able to ascertain satisfactory products from those that are unsatisfactory by visual examination and touch.

In most production situations, certain amounts of waste are generated. The ability to reprocess and reuse the waste materials can be a strong incentive in choosing a specific production composition. The inventive composition has been found to be reprocessable, and thus can be repelletized and reused.

The ability to pelletize the inventive composition is important, because it would be difficult to convert the molten composition directly into fabrics by an extrusion process without pelletizing. The blend would be a gummy glob too large to feed into the processing equipment. Pelletizability was evaluated by attempting to dice the product from a rubber two-roll mill, or by underwater pelletizing, or stranding followed by cutting the strand into pellets. The composition was considered pelletizable if it could be pelletized by at least one of the above three methods. It has been found that where the melt flow rate (MFR) of the composition was below 800 grams/10 minutes, it was most convenient to pelletize. Thus, below a MFR of 800 grams/10 minutes, the blend was found to have "excellent pelletizability". From 800 to 950 or so, the pelletizing process was generally slightly difficult and judged to be "good" From 950 to 1100, pelletization was generally "fair" while above 1100, it was found to be "poor". In all cases, melt flow rate was obtained using condition "L" of ASTM method D1238-86 which is 230° C. and 2.16 kg. Most desirably, the ratio of the components was adjusted to obtain a melt flow rate of about 50 to 400 grams/10 minutes.

Drapability is another important property or characteristic of the products formed from the inventive composition. An "excellent" rating was given if a film or a fabric prepared from the inventive composition had the drapability of an unstarched cotton handkerchief. Slightly stiffer fabrics and films were rated as "good". Increasingly stiffer fabrics and films were judged to be "fair" or "poor". The importance of drapability is evident in such applications as baby diapers or sanitary napkins since a drapable fabric is more comfortable on the skin than one that is not, especially when contacting the human skin for periods of time extending up to four hours or longer.

Studies have shown that a low Shore A hardness measured in accordance with ASTM D-2240 provides a correlation with good drapability. Thus, compositions with low Shore A hardness values, below 95, gave excellent drapability. Conversely, fabrics with high Shore A hardness values, over 95, showed poor drapability. In all cases, Shore A hardness was measured instantaneously, or on a three second delay.

The inventive composition can also include flame retardant materials, such as aluminum trihydrate, chlorinated and/or brominated or nitrogen-phosphorus-containing compounds. Flame retardant additives are generally included in amounts varying from about 5 to 40% by weight of total composition.

Other additives that may also be used in the inventive composition include antioxidants, such as those containing hindered phenols and/or hindered amines, phosphites, phosphates, thioesters, and the like, as well as stabilizers and fillers, such as talc, magnesium oxide, calcium carbonate, and the like. Dusting agents such as talc, powdered high density polyethylene, chalk and other powders can be used to prevent massing of pellets in the final blend. Release agents, such as stearates and silicones can be included to prevent sticking to blending equipment during processing. In addition, antiblocking agents and antistatic agents can also be included. However, the total amount of all additives should not exceed about 5% of the total weight of the inventive composition.

The composition can be converted to film or fabric material by any suitable method known to those skilled in the art, such as conventional cast or blown film extrusion, compression molding and sheeting, non-woven fabric processing, fabrication into wipes, extrusion melt spinning into fibers, followed by weaving into a fabric, or extrusion coating onto a synthetic or natural fabric such as cotton, paper, polyester, nylon, and the like.

The fabric can be used for holding ultra-absorbents used in baby and adult diapers and sanitary napkins. In order to achieve good spinning and for conversion to non-woven fabric, it was found necessary to adjust the viscosity of the blend composition to a melt flow rate greater than 30, and preferably from about 80 to 200 grams/10 minutes at 230° C. and 2.16 kilograms (Cond. L). All melt flow rates in the examples and throughout the specification were measured at these conditions. Low density polyethylene (LDPE), ethylene vinyl acetate (EVA), and other polyethylene based raw materials were measured at 190° C. and 2.16 kilograms.

In the following examples which serve to illustrate the present invention, all percentages are by weight unless otherwise noted.

EXAMPLE 1A

A blend of 55.98% extruder-modified polypropylene Escorene® grade 3145 from Exxon Chemical Company with a melt flow rate of 325 grams/10 minutes at condition "L", 25% of an ethylene-propylene-diene terpolymer elastomer (EPDM) with a Mooney viscosity of 59 ML1+4 at 125° C. and an ethylene/propylene ratio of 53 to 47, 2.37% of a stabilizer masterbatch (containing 54.37% dilauryl thiodipropionate (DLTDP), 13.75% of Tinuvin 327 stabilizer from Ciba Geigy, 18.13% of Maglite D magnesium oxide from Merck & Co., and 13.75% of Irganox 1010 stabilizer from Ciba Geigy) and 16.65% of a peroxide modified polypropylene (35 MFR polypropylene modified with 5% Vulcup R peroxide from Hercles and 0.30% Lupersol 101 peroxide from Penwalt) was prepared in a Brabender melt mixer at 400° F. and 55 rpm for 7 minutes. The blend had the following properties: Instantaneous Shore hardness of 94A, excellent drapability, good pelletizability and a melt flow rate of 563 grams/10 minutes at condition L.

EXAMPLE 1B

A blend of 55.98% polypropylene from Exxon Chemical Company with a melt flow rate of 11 grams/10 minutes at condition L (230° C. and 2.16 kg), 25% of an ethylene-propylene-diene terpolymer elastomer (EPDM) with a Mooney viscosity of 59 ML 1+4 at 125° C. and an ethylene/propylene ratio of 53 to 47, 2.37% of the same stabilizer masterbatch used in Example 1A and 16.65% of a polypropylene with a melt flow rate (MFR) of 35 grams/10 minutes was prepared in a Brabender melt mixer at 400° F. and 55 rpm for 7 minutes. This blend thus is identical to the one in Example 1A in preparation technique as well as ratios of components except where polymers of 11 MFR and 35 MFR were used in this example. In Example 1A the corresponding oligomers were prepared from the same monomer, propylene. This blend gave the following properties: Instantaneous Shore hardness of >99 A, poor drapability, excellent pelletizability and a melt flow rate of 3.2 grams/10 minutes at condition L. It is obvious that the hardness of this blend is too high to yield a "soft drapable material." Also the low melt flow rate of 3.2 grams/10 minutes is too low to be useful as a drapable material because of its high viscosity.

EXAMPLE 2

A blend 69.86% of the same reactor-modified polypropylene Escorene 3145 used in Example 1, 2.37% of the same stabilizer masterbatch used in Example 1 and 27.77% of an ethylene propylene copolymer rubber (EPR) with an E/P ratio of 65:35 with no diene, broad molecular weight and a Mooney viscosity of 20 ML 1+8 at 127° C. This blend prepared in the same manner as in Examples 1A and 1B produced an Instantaneous Shore Hardness of 89A and an MFR of 57 grams/10 minutes, excellent pelletizability and medium drapability.

EXAMPLES 3-6

Blends were prepared using the ingredients and weight % tabulated below in Table 1. EPR was same as used in Example 2, the polyolefin oligomer was Amorphous Poly (Alpha-Olefin) X-400 also called APAO B3Al5 available from El Paso Products Co.

TABLE 1

| Ex | Polyolefin Oligomer | EPR | Stabilizer* Masterbatch | Shore Hardness | MFR | Pelletizability | Drapability |
|---|---|---|---|---|---|---|---|
| 3 | 60.13% | 37.5% | 2.37% | 60A | 94 | Excellent | Excellent |
| 4 | 35.28% | 62.38% | 2.34% | 56A | 62 | Excellent | Excellent |
| 5 | 63.63% | 34.03% | 2.34% | 52A | 94 | Excellent | Excellent |
| 6 | 69.88% | 27.78% | 2.34% | 56A | 1000 | Fair | Excellent |

*-Composition same as in Example 1B.

EXAMPLES 7-8

Blends similar to those in Examples 3-6 were prepared except that the olefinic elastomer was changed to the EPDM used in Example 1B, with the components, weight % and results tabulated in Table 2:

TABLE 2

| Ex | Polyolefin Oligomer | EPDM | Stabilizer Masterbatch | Shore Hardness | MFR | Pelletizability | Drapability |
|---|---|---|---|---|---|---|---|
| 7 | 60.13% | 37.50% | 2.37% | 55A | 237 | Excellent | Excellent |
| 8 | 48.83% | 48.83% | 2.34% | 56A | 161 | Excellent | Excellent |

EXAMPLE 9

A blend of 56.7% Amorphous Poly (Alpha-Olefin) oligomer B3Al5 from El Paso Products Company, 34.03% of an ethylene-propylene-ethylenylnorbornene terpolymer from Uniroyal called Royalene 552, with a Mooney viscosity of 50 ML1+4 at 125° C. and an ethylene propylene ratio of 75:25, 6.93% of a peroxide-modified polypropylene (97.4% of a 35 MFR polypropylene reacted with 2-6% Varox powder, a peroxide concentrate from Vanderbilt Co.), and 2.34% of the stabilizer masterbatch used in Example 1B was prepared. This blend had a Shore Hardness of 69A, high melt flow rate of 868, excellent drapability and good pelletizability.

EXAMPLES 10-17

Blends of the same poly(alpha-olefin) oligomer used in Example 9 with the same peroxide-modified polypropylene used in Example 9 and the same ethylene-propylene copolymer elastomer (EPR) used in Example 2 with the same stabilizer masterbatch used in Example 1B. Blend ratios and properties are tabulated in Table 3 as follows:

TABLE 3

| Ex | Polyolefin Oligomer | Peroxide Modified Polypropylene | EPR | Stabilizer Masterbatch | Shore Hardness | MFR | Pelletizability | Drapability |
|---|---|---|---|---|---|---|---|---|
| 10 | 49.8% | 13.80% | 34.00% | 2.40% | 77A | 429 | Excellent | Excellent |
| 11 | 56.7% | 6.93% | 34.03% | 2.34% | 66A | 694 | Good | Excellent |
| 12 | 56.7% | 3.48% | 37.50% | 2.32% | 60A | 397 | Excellent | Excellent |
| 13 | 56.7% | 1.75% | 39.25% | 2.30% | 59A | 441 | Excellent | Excellent |
| 14 | 28.35% | 6.93% | 62.38% | 2.34% | 62A | 589 | Excellent | Excellent |
| 15 | 56.7% | 0.88% | 40.13% | 2.29% | 60A | 522 | Excellent | Excellent |
| 16 | 56.7% | 0.45% | 40.58% | 2.27% | 60A | 333 | Excellent | Excellent |
| 17 | 49.7% | 10.40% | 37.50% | 2.40% | 72A | 321 | Excellent | Excellent |

EXAMPLES 18-19

Blends of the poly(alpha-olefin) oligomer used in Example 9 with the same peroxide-modified polypropylene used in Example 9 and the same ethylene-propylene diene polymer (EPDM) used in Example 1B with the same stabilizer masterbatch used in Example 1B were prepared. Blend ratios and properties are tabulated in Table 4 as follows:

TABLE 4

| Ex | Polyolefin Oligomer | Peroxide Modified Polypropylene | EPDM | Stabilizer Masterbatch | Shore Hardness | MFR | Pelletizability | Drapability |
|---|---|---|---|---|---|---|---|---|
| 18 | 49.8% | 13.80% | 34.00% | 2.40% | 78A | 525 | Excellent | Excellent |
| 19 | 56.7% | 6.93% | 34.03% | 2.34% | 69A | 868 | Good | Excellent |

EXAMPLES 20-21

Two blends of peroxide-modified polypropylene (94.7% polypropylene, 5% Vulcup R and 0.3% Lupersol 101), the poly (alpha-olefin) used in Example 9 and the EPDM used in Example 1B were blended with the stabilizer masterbatch described in Example 1B. Blend ratios and properties are tabulated in Table 5 as follows:

TABLE 5

| Ex | Polyolefin Oligomer | Peroxide Modified Polypropylene | EPDM | Stabilizer Masterbatch | Shore Hardness | MFR | Pelletizability | Drapability |
|---|---|---|---|---|---|---|---|---|
| 20 | 55.98% | 16.65% | 25.0% | 2.37% | 73A | 1000 | Fair | Excellent |
| 21 | 43.50% | 6.93% | 47.2% | 2.37% | 67A | 403 | Excellent | Excellent |

EXAMPLES 22-31

Blends were prepared with the same peroxide-modified polypropylene used in Examples 20 and 21, the poly (alpha-olefin) oligomer used in Example 9, the EPR used in Example 2 and the stabilizer masterbatch used in Example 1B. The blend ratios and properties are tabulated in Table 6 which follows, with the balance being the stabilizer:

TABLE 6

| Ex | Polyolefin Oligomer | Peroxide Modified Polypropylene | EPR | Shore Hardness | MFR | Pelletizability | Drapability |
|---|---|---|---|---|---|---|---|
| 22 | 49.73% | 10.40% | 37.50% | 72A | 87 | Excellent | Excellent |
| 23 | 56.70% | 6.93% | 34.03% | 67A | 86 | Excellent | Excellent |
| 24 | 43.50% | 10.40% | 43.50% | 72A | 57 | Excellent | Excellent |
| 25 | 45.40% | 6.93% | 45.40% | 77A | 262 | Excellent | Excellent |
| 26 | 45.40% | 3.48% | 48.83% | 60A | 231 | Excellent | Excellent |
| 27 | 45.40% | 1.75% | 50.56% | 64A | 141 | Excellent | Excellent |
| 28 | 49.73% | 16.65% | 31.30% | 78A | 1000 | Fair | Excellent |
| 29 | 56.70% | 10.4% | 30.55% | 68A | 438 | Excellent | Excellent |
| 30 | 33.50% | 16.93% | 47.20% | 60A | 287 | Excellent | Excellent |
| 31 | 64.184% | 6.92% | 26.52% | 67A | 1000 | Fair | Excellent |

EXAMPLE 32

A blend of 5% polypropylene 35 MFR, 46.3% of the poly(alpha-olefin) oligomer from Example 3, 46.31% of the EPDM used in Example 1 and 2.39% of the stabilizer masterbatch gave a Shore Hardness of 62A, an MFR of 218, excellent processibility, pelletizability and drapability.

EXAMPLE 33

A blend of 20% polypropylene copolymer 11 MFR, 38.83% of the poly (alpha-olefin) oligomer from Example 3, 38.83% of the EPDM used in the previous example and 2.34% of the stabilizer masterbatch gave a Shore Hardness of 84A, 81 MFR, excellent pelletizability and drapability.

EXAMPLE 34

A blend of 5% polypropylene Escorene 3145 with an MFR of 325, 46.31% of the poly (alpha-olefin) oligomer from Example 3, 46.31% of the EPDM used in Example 32 and 2.38% of the stabilizer masterbatch used in Example 1B gave a Shore hardness of 90A, 125 MFR and excellent drapability and pelletizability.

EXAMPLE 35

A blend of 10.00% polypropylene copolymer with 11 MFR and differential scanning calorimeter (DSC) melting point of 150° C., 43.814% of the poly(alpha-olefin) oligomer used in Example 9, 43.814% of the EPDM used in Example 1 and 2.372% of the stabilizer masterbatch used in Example 1B gave the following properties: 76A Shore hardness, 116 melt flow rate and excellent pelletizability and drapability.

EXAMPLE 36

A blend of 74.498% polypropylene homopolymer with 5 MFR, 45.064% poly (alpha-olefin) oligomer used in Example 9, 45.064% of the EPDM used in Example 1 and 2.374% of the stabilizer masterbatch used in Example 1B gave an instantaneous Shore hardness of 70A and 166 MFR and had excellent pelletizability and drapability.

A blend of 63.63% of the poly (alpha-olefin) oligomer used in Example 9, 17.03% of the EPDM used in Example 1, 17.03% of Trilene ™ liquid EPDM from Uniroyal and 2.31% of the stabilizer masterbatch from Example 1B gave a very low Shore A hardness value of 50A and 848 MFR with good pelletizability and excellent drapability and reprocessibility.

EXAMPLE 38

In the formulation of Example 37, 14.53% of the 17.03% EPDM was replaced by a 35 MFR polypropylene homopolymer. The Shore A hardness of this blend was 80A and 418 MFR with excellent pelletizability, good drapability and reprocessability.

EXAMPLE 39

The 35 MFR polypropylene of Example 38 was replaced by the polypropylene copolymer used in Example 35. The blend gave values of 390 MFR and 73A hardness on the Shore A scale with good pelletizability and excellent drapability.

EXAMPLE 40

A blend of 46.31% of the poly (alpha-olefin) oligomer used in Example 9, 46.31% of the EPDM used in Example 1, 5% of an ethylene-vinyl acetate copolymer with 18% vinyl acetate content and a melt index at 190° C. of 1.4 grams/10 minutes and 2,38% of the stabilizer masterbatch used in Example 1B gave a MFR of 150 an Shore A hardness of 60 A with excellent pelletizability and excellent drapability.

EXAMPLE 41

A blend of 38.825% of the poly (alpha-olefin) oligomer used in the previous example, 38.825% of the EPDM used in the previous example, 20.00% of a low density polyethylene with a melt index at 190° C. of 9grams/10 minutes and a density of 0.918 grams/mil and 2.35% of the stabilizer masterbatch gave a Shore A hardness of 72A, 127 MFR, excellent drapability and pelletizability.

EXAMPLE 42

A blend of 43.814% poly (alpha-olefin) oligomer used in Example 9, 43.814% of the EPDM used in Example 1, 4.998% of a 325 MFR extruder-modified polypropylene from Exxon Chemicals, 4.998% of a isobutylene-butene copolymer called Indopol H-100 from Amoco Chemicals and 2.376% of the stabilizer masterbatch used in Example 1B gave excellent processibility, pelletizability and drapability.

EXAMPLE 43

When the rubber-modified polypropylene in the previous example was replaced by the low density polyethylene used in Example 41 and all other components were the same as in the previous example, such a blend gave values of 55A Shore hardness and 124 MFR with excellent drapability and pelletizability.

EXAMPLES 44–49

In order to achieve dyeability, blends were prepared using two polypropylenes grafted with acrylic acid, (PPgAA), one of which had a MFR of 12 and the other a MFR of 40, the same poly-olefin and EPDM as in Example 42, isobutene-butene copolymer used in Example 42 and the same stabilizer masterbatch used in Example 1B. Blend ratios and properties are tabulated in Table 7 as follows:

TABLE 7

| Ex | Polyolefin Oligomer | Stab. M.B. | EPDM | PPgAA 12 MFR | PPgAA 40 MFR | Butene-Isob. Copoly. | MFR "L" | Shore A Hardness | Pelletizability | Drapability |
|---|---|---|---|---|---|---|---|---|---|---|
| 44 | 17.53 gram | 0.95 gram | 17.53 gram | 2.00 gram | — | 2.00 gram | 178 | 63A | Excellent | Excellent |
| 45 | 17.53 gram | 0.95 gram | 17.53 gram | 4.00 gram | — | — | 131 | 63A | Excellent | Excellent |
| 46 | 18.03 gram | 0.95 gram | 18.03 gram | 3.00 gram | — | — | 109 | 63A | Excellent | Excellent |
| 47 | 17.53 gram | 0.95 gram | 17.53 gram | — | 2.00 gram | 2.00 gram | 140 | 58A | Excellent | Excellent |
| 48 | 17.53 gram | 0.95 gram | 17.53 gram | — | 4.00 gram | — | 126 | 63A | Excellent | Excellent |
| 49 | 18.03 gram | 0.95 gram | 18.03 gram | — | 3.00 gram | — | 177 | 68A | Excellent | Excellent |

Fibers, films and fabrics were prepared from the blends of Examples 44 to 49 and were dyed with two different cationic 5% dye solutions using standard dyeing procedures. One dye solution was made from Acrydine Orange and the other dye solution was made from Toluidene Blue. All six blends picked up the dye. Toluidene Blue-dipped samples gave violet-colored fibers, fabrics and films while the Acrydine Orange-dipped samples gave yellowish orange-colored articles, demonstrating that the blends had good dyeability as well. Control film samples prepared from th blends of Examples 35 and 36 (which did not contain the functionally modified polyolefin component) were run through the same dye solutions and these did not pick up any dye and remained colorless.

What is claimed is:

1. A thermoplastic pelletizable polymer composition having a Shore A hardness below about 95, and a melt flow rate of about 30 grams/10 minutes to 1100 grams/10 minutes at 230° C. and 2.16 kilograms, consisting essentially of:
    (a) An oligomer or degraded polyolefin having a number average molecular weight less than about 15,000 and a melt flow rate greater than about 300 grams/10 minutes at 230° C. and 2.16 kilograms; and
    (b) a polyolefin elastomer, having an elastic modulus of less than about 6000 psi at room temperature when measured in the uncrosslinked state, and wherein the ratio of (a):(b) varies from about 90:10 to 20:80, respectively said composition which, when converted to a film or fabric is reprocessable and drapable.

2. The composition of claim 1, wherein the melt flow rate for the composition varies from about 50 grams/10 minutes to 800 grams/10 minutes, and the ratio of (a):(b) varies from about 30:70 to 70:30.

3. The composition of claim 1, wherein the oligomer is a degraded polyolefin prepared in situ by using a blend of polyolefin with a suitable degradant.

4. Tne composition of claim 1, also including up to about 30 weight % of a polyolefin thermoplastic polymer.

5. The composition of claim wherein (a) is formed from a monomer selected from the group consisting of hexene-1, pentene-1, isopentene, ethylene, propylene, butene-1, isobutene, 4-methylpentene-1, butadiene, and mixtures thereof.

6. The composition of claim 1, wherein (b) is selected from the group consisting of ethylene-propylene copolymers, ethylene-propylene-diene terpolymers, and isobutylene polymers.

7. The composition of claim 4, wherein the polyolefin thermoplastic polymer is selected from the group consisting of ethylene polymers, polypropylene homopolymers and copolymers, poly(butene-1), poly(4-methylpentene-1) and mixtures thereof.

8. The composition of claim 4, wherein the polyolefin thermoplastic polymer is grafted with a monomer containing a functional group selected from the group consisting of carboxylic acid, carboxylic acid derivatives, acid chlorides, amides, imides, amines, isocyanates and mixtures thereof.

9. The composition of claim 1, also including a flame retardant additive of about 5 to 40% by weight of the total composition.

10. The composition of claim 1, characterized by being reprocessable.

11. The composition of claim 1, having a melt flow rate greater than about 50 grams/10 minutes at 2.1° C. and kilograms (Cond. L.).

12. A drapable film or fabric made from a composition having a Shore A hardness below about 95, and a melt flow rate of about 30 grams/10 minutes to 1100 grams/10 minutes at 230° C. and 2.16 kilograms, consisting essentially of:
 (i) an oligomer or degraded polyolefin having a number average molecular weight less than about 15,000 and a melt flow rate greater than about 300 grams/10 minutes at 230° C. and 2.16 kilograms; and
 (ii) a polyolefin elastomer having an elastic modulus of less than about 6000 psi at room temperature in the uncrosslinked state, and wherein the ratio of (a)? (b) varies from about 90:10 to 20:80, respectively.

13. The film or fabric of claim 12, wherein the oligomer is a degraded polyolefin prepared in situ by using a blend of polyolefin with a suitable degradant.

14. The film or fabric of claim 12, wherein the composition has a melt flow rate of about 50 to 400 grams/10 minutes and pelletized 15. The film or fabric of claim 12, also including up to about 30 weight % of a polyolefin thermoplastic polymer.

16. The film or fabric of claim 12, wherein the oligomer is fomred from a monomer selected from the group consisting of hexene-1, pentene-1, isopentene, ethylene, propylene, butene-1, isobutene, 4-methylpentene-1, butadiene, and mixtures thereof.

17. The film or fabric of claim 12, wherein the olefin elastomer is selected from the group consisting of ethylene-propylene copolymers, ethylene-propylene-diene terpolymers, and isobutylene polymers.

18. The film or fabric of claim 15, wherein the polyolefin thermoplastic polymer is selected from the group consisting of ethylene polymers, polypropylene homopolymers and copolymers, poly(butene-1), poly(4-methylpentene-1) and mixtures thereof.

19. The film or fabric of claim 18, wherein the polyolefin thermaplastic polymer is grafted with a monomer containing a functional group selected from the group consisting of carboxylic acid, carboxylic acid derivatives, acid chlorides, amides, imides, amines, isocyanates and mixtures thereof.

20. The film or fabric of claim 12, wherein the blend also includes a flame retardant additive of about 5 to '% by weight of the total composition.

* * * * *

UNITED STATES PATENT AND TRADEMARK OFFICE
CERTIFICATE OF CORRECTION

PATENT NO. : 4,833,195  
DATED : May 23, 1989  
INVENTOR(S) : Ashok M. Adur et al.

Page 1 of 2

It is certified that error appears in the above-identified patent and that said Letters Patent is hereby corrected as shown below:

In Title sheet, list of inventors, change "Joseph M. Hogue, Jr." to --Joseph Hogue, Jr.--.
In Abstract, line 6, change "or" to --of--.
At column 2, line 18, change "elsstomer" to --elastomer--.
At column 4, line 58, change "cmn" to --can--.
At column 5, line 45, insert --.-- after "'good'".
At column 7, line 47, insert --of-- after "blend".
At column 10, line 40, change "74.498" to --7.498--.
At column 10, lines 61-62, insert --EXAMPLE 37-- after "drapability." and before "A", on a separate line.
At column 11, line 31, change "2,38" to --2.38--.
At column 11, line 32, change "an" to --and--.
At column 12, line 58, insert --1-- after "claim".
At column 13, line 4, change "4" to --7--.
At column 13, line 16, change "2.1" to --230--.
At column 13, line 17, insert --2.16-- after "and".
At column 13, line 32, change "?" to --:--.
At column 14, line 6, insert --.-- after "pelletized".
At column 14, line 11, change "fomred" to --formed--.

UNITED STATES PATENT AND TRADEMARK OFFICE
CERTIFICATE OF CORRECTION

PATENT NO. : 4,833,195

DATED : May 23, 1989

INVENTOR(S) : Ashok M. Adur et al.

It is certified that error appears in the above-identified patent and that said Letters Patent is hereby corrected as shown below:

At column 14, line 31, change "'" to -- 40 --.

Signed and Sealed this

Sixteenth Day of January, 1990

*Attest:*

JEFFREY M. SAMUELS

*Attesting Officer*   *Acting Commissioner of Patents and Trademarks*